United States Patent [19]

Acks

[11] Patent Number: 5,213,410

[45] Date of Patent: * May 25, 1993

[54] METHOD AND APPARATUS FOR ILLUMINATING AN UNDERWATER ENVIRONMENT

[75] Inventor: Robert S. Acks, San Diego, Calif.

[73] Assignee: Remote Ocean Systems, Inc., San Diego, Calif.

[*] Notice: The portion of the term of this patent subsequent to Apr. 14, 2009 has been disclaimed.

[21] Appl. No.: 825,564

[22] Filed: Jan. 24, 1992

Related U.S. Application Data

[63] Continuation-in-part of Ser. No. 579,655, Sep. 10, 1990.

[51] Int. Cl.⁵ .................. H01R 33/975; F21V 21/00
[52] U.S. Cl. .................... 362/269; 362/267; 362/218; 362/226; 362/247; 362/248; 362/252; 362/431
[58] Field of Search ............. 562/218, 222, 226, 247, 562/248, 252, 263, 264, 267, 296, 369, 378, 431, 405

[56] References Cited

U.S. PATENT DOCUMENTS

| | | | |
|---|---|---|---|
| 3,735,329 | 5/1973 | Funabashi et al. | 362/405 |
| 3,949,212 | 4/1976 | Larrimore | 362/267 |
| 4,851,980 | 7/1989 | McWilliams et al. | 362/431 |
| 5,105,346 | 4/1992 | Acks et al. | 362/267 |

Primary Examiner—Ira S. Lazarus
Assistant Examiner—L. Heyman
Attorney, Agent, or Firm—Brown, Martin, Haller & McClain

[57] ABSTRACT

The underwater illumination apparatus for use in nuclear facilities has a high pressure sodium arc lamp sealed to a stainless steel base with a flexible, radiation-resistant seal to provide a watertight and shock-absorbing connection. A wet-mateable base connector is attached to the base to permit connection to a lower cable. A light-transmissive, impact-resistant cover is formed around the base and the arc lamp. The cover has holes through which water can flow in and out to conduct heat away from the arc lamp. The combination of the above elements creates a modular unit which is replaced as a whole when the arc lamp burns out. The lower cable which provides power to the arc lamp is attached at its other end to a ballast power supply which is hermetically sealed in a stainless steel housing. Wet mateable connectors are attached at the inlet and outlet of the ballast power supply to attach to the lower cable and to the upper cable connection to a 120 VAC source. A number of units may be assembled with a single reflector to create a light ring.

22 Claims, 1 Drawing Sheet

METHOD AND APPARATUS FOR ILLUMINATING AN UNDERWATER ENVIRONMENT

This is a continuation-in-part of Ser. No. 07/579,655 filed Sep. 10, 1990, pending.

FIELD OF THE INVENTION

The present invention relates to illumination systems and more particularly to illumination systems for hazardous underwater environments.

BACKGROUND OF THE INVENTION

A large number of reasons exist for lighting a large underwater environment including security, safety and illumination of work surfaces. Applications include oil drilling platforms, lighting around submarines and ships and for storage pools. In all applications it is desirable to use a high efficiency, long lifetime light source which can provide continuous lighting with minimal maintenance. Nowhere is the need for a low maintenance lighting system more pronounced than in nuclear facilities in spent fuel storage pools and reactor vessels, and in other nuclear environments, in which water is used to slow the reaction rate, where service of the lighting system results in radiation exposure for maintenance personnel.

Typically, these pools require a large number of lights for effective illumination. Traditionally this lighting has been accomplished using 1000 W, 120 V incandescent spotlights or floodlights. These bulbs have lifetime ratings of 2,000 to 4,000 hours, and provide total light output of 17,000 lumens. At a lifetime of 4,000 hours, a particular light fixture will require 2.19 bulb changes per year, with maintenance personnel being exposed to radiation at each bulb change. A typical fuel storage pool uses 50 incandescent light fixtures. Thus, maintenance personnel are subjected to short periods of radiation quite frequently for single bulb changes or to extended periods of exposure for "en mass" changes.

High pressure sodium (HPS) lighting has been used extensively for street and parking area illumination, lighting in factories and for security lighting. The primary advantages of HPS lights are 1) high efficiency and 2) very long lifetime. Compared to an incandescent bulb, an HPS bulb has a lifetime rating of 24,000 hours and provides a total light output of 140,000 lumens. Simple math emphasizes the advantages of HPS lights: one HPS bulb provides the light of eight incandescent bulbs for six to twelve times longer.

It would be desirable to take advantage of the long lifetime of HPS lighting for illumination of hazardous underwater environments.

SUMMARY OF THE INVENTION

It is an advantage of the present invention to provide an apparatus and method for illuminating underwater environments using high pressure sodium (HPS) lights. In an exemplary embodiment, the underwater illumination apparatus has a high pressure sodium arc lamp sealed to a stainless steel base with a flexible, radiation-resistant potting material to provide both a watertight seal and a shock-absorbing connection. Alternatively, one or more O-rings may also be used to provide watertight connection of the arc lamp to the base. A wet-mateable base connector is attached to the base to permit connection to a lower cable. A light-transmissive, impact-resistant cover is formed around the base and the tube. The cover is either a mesh or is a solid surface with holes through which water can flow in and out to conduct heat away from the arc tube. The combination of the above elements creates a modular unit which is replaced as a whole when the arc lamp burns out.

The lower cable which provides power to the arc lamp has a connector which mates with the base connector. The lower cable is attached at its other end to a ballast power supply which is hermetically sealed in a stainless steel housing. Wet-mateable connectors are provided at the inlet and outlet of the ballast power supply to attach to the lower cable and to the upper cable for connection to a 120 VAC source.

A highly-polished reflector partially surrounds the modular unit to provide directional lighting capability. All components are mounted on a pole by which the apparatus may be suspended into the water.

The arc lamp unit and corresponding reflector can be configured in any arrangement, and multiple arc lamps units can be placed adjacent to each other within a continuous reflector, or contiguous reflectors. For example, a circular configuration may be assembled for placement in the center of an area to be illuminated with the units placed end-to-end to form a ring. This would provide a replacement for the incandescent light rings which are currently used in reactor vessels.

In applications where a light source is needed that can be safely used in both water and in air without modification, a stainless steel screen is used to cover the arc lamp. Other corrosion-resistant, chemically-stable metals may also be used for a screen. The metal screen permits cooling of the arc lamp while underwater but will not melt when used in air, as a plastic-like material might.

BRIEF DESCRIPTION OF THE DRAWINGS

The present invention will be better understood from the following detailed description of a preferred embodiment, taken in conjunction with the accompanying drawings, in which like reference numerals refer to like parts, and in which.

DETAILED DESCRIPTION OF THE PREFERRED EMBODIMENT

Figure 1:
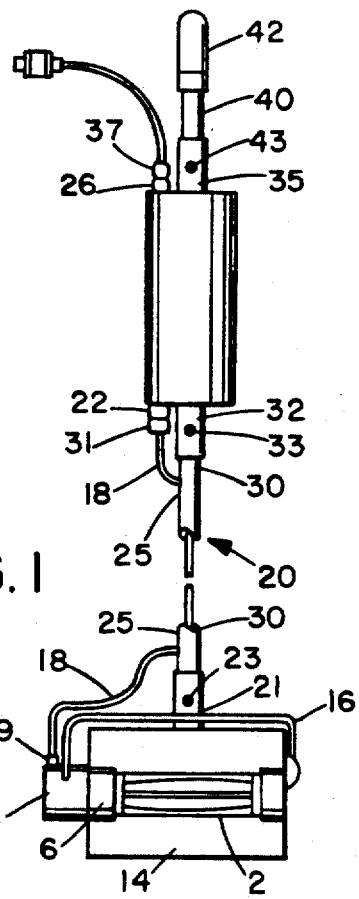
FIG. 1 is a diagrammatic front elevation of a first embodiment of the illumination apparatus.
Figure 2:
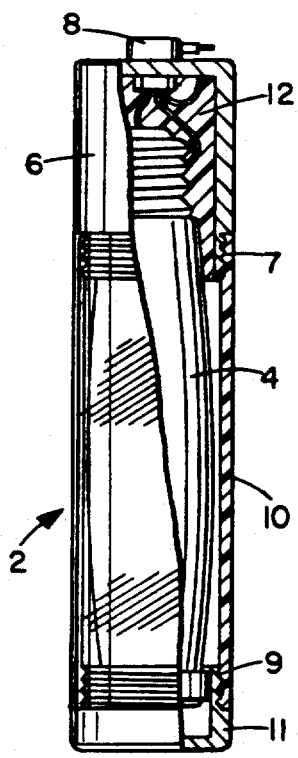
FIG. 2 is a side elevation partially cut away of the modular lighting unit.
Figure 5:
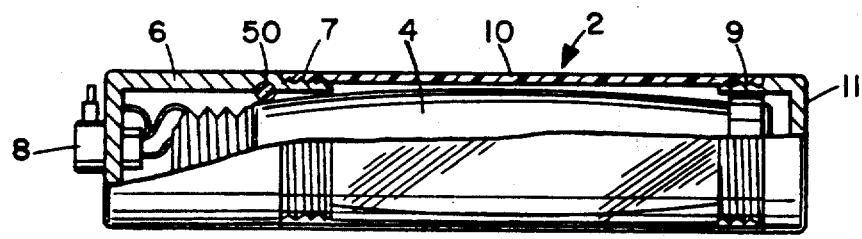
FIG. 5 is a side elevation, partially cut away, of the modular unit with O-ring seal.

As shown in FIGS. 1 and 2, modular lighting unit 2 comprises arc lamp 4, base 6, connector 8 and transparent cover 10. Potting material 12 seals the connection between arc lamp 4 and base 6. An O-ring 50 may also be inserted between the base 6 and arc lamp 4 in place of the potting material 12 to provide a watertight seal and shock-absorption as shown in FIG. 5. A reflector 14 partially surrounds modular lighting unit 2 and is supported by yoke 16 to permit pivoting of reflector 14. Lower cable 18 mates with connector 8 and runs up pole 20 to mate with lower connector 22 of ballast power supply 24. Ballast power supply 24 is mounted on pole 20. Upper connector 26 mates with upper cable 28 which provides connection to a 120 VAC source.

The components of modular lighting unit 2 are permanently assembled to provide a watertight seal between the arc lamp 4 and base 6. Base 6 is preferably made of stainless steel with soldered or welded wire connections. On the outer end of base 6 connector 8 is attached. Connector 8 is a low profile wet-mateable connector so the modular unit 2 may be changed underwater without drying the connectors. The base 6 is filled with potting material 12 to cover the end of arc lamp 4 providing a permanent waterproof bond. Potting material 12 is flexible, radiation tolerant and retains its effectiveness at high temperatures. A suggested material is silicone sealant.

An O-ring 50 may be used as an alternative to potting material 12, however it must also possess radiation and high temperature tolerance. Since the base 6 will not be filled in this embodiment, extra care must be taken to assure that its exterior is well sealed against water intrusion.

Arc lamp 4 is preferably a high pressure sodium arc lamp chosen for its long lifetime and highly-efficient light output. Such a bulb is rated at 24,000 hours lifetime with an output of 140,000 lumens for a 1000 watt bulb. For situations where lower light output is desired, a lower wattage rating high pressure sodium or a low pressure sodium bulb may be used. Other types of arc lamps are available at different wattage ratings and may be used, including mercury vapor and thallium-iodide-doped mercury vapor to provide high-efficiency, long lifetime lighting. Use of mercury vapor lamps in nuclear pools is generally undesirable due to the potential for attack of stainless steel by mercury if a bulb should break. However, mercury vapor lights, especially thallium-iodide doped lights, have the advantage of lower absorption of the emitted wavelength of light in water than sodium lights, so mercury vapor may be desirable for use in non-nuclear, clear water applications.

Transparent cover 10 is constructed of an impact-resistant polycarbonate such as LEXAN or other similar impact-resistant material. Cover 10 has internal threads 11 at both ends to mate with external threads 7 of base 6 and external threads 9 of end plug 11. End plug 11 is preferably made of stainless steel. The arc lamp 4 is supported within the cover 10 so that it does not touch the inner surfaces of cover 10 or end plug 11. The arc lamp 4 is suspended so that shock is not transferred if the cover 10 is struck and to avoid melting the cover 10 if is should come in contact with the arc lamp 4. To provide cooling of arc lamp 4, several holes are made in cover 10 to permit water to enter and exit modular unit 2.

Figure 3:
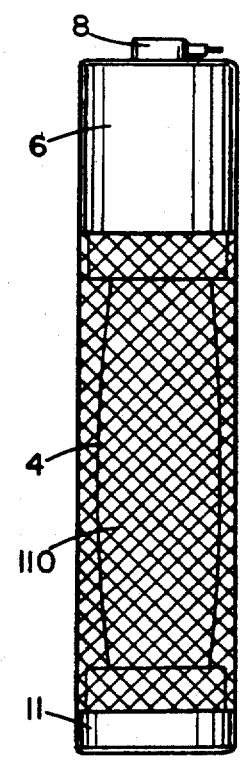
FIG. 3 is a diagrammatic side view of an alternate protective cover configuration.

As an alternative to the polycarbonate cover, a stainless steel screen 110, shown in FIG. 3, is used to permit use of the same unit in air and water. While underwater, the arc lamp 4 is sufficiently cooled that it does not heat the cover. However, if use of the same unit in air is desired, there is a risk that the heat generated by the lamp will melt polycarbonate. A stainless steel screen 110 will tolerate the higher temperatures in air while allowing water to flow through underwater without significantly impairing illumination. The screen 110 is sufficiently rigid to provide impact-resistance similar to that of the polycarbonate. It will be apparent to a user that an arc lamp 4 that has been in use will need to be cooled somewhat before moving from air to water.

Reflector 14 is generally parabolic in shape with modular unit 2 centered at its focus. The inner surface is highly polished to provide a high-efficiency reflection. Reflector 14 is held in place by yoke 16 which is rotatably attached at opposite ends of the reflector to permit pivoting of the reflector in a vertical direction. Reflector 14 has a cylindrical extension 15 which is open and has an inner diameter slightly larger than the outer diameter of modular unit 2. An opening 17 in an upper portion of cylindrical extension 15 permits insertion of connector 19 of lower cable 18 to mate with connector 8.

Figure 4:
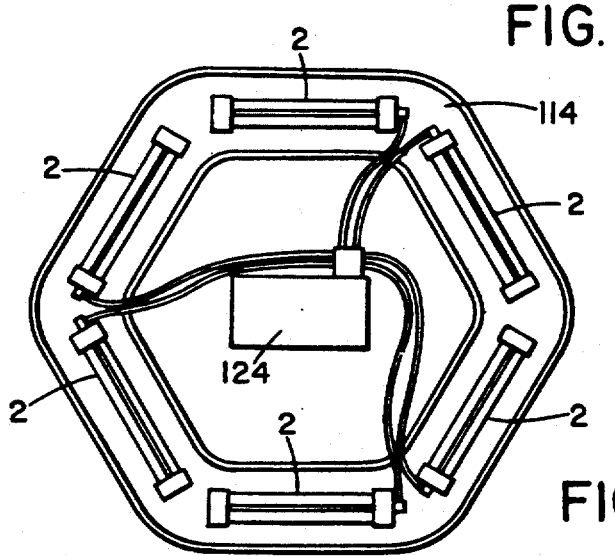
FIG. 4 is a diagrammatic view of a light ring according to the present invention.

A single reflector may be formed in any desired shape, for example, the continuous reflector ring 114 shown in FIG. 4. Since the modular unit 2 is separable from the reflector ring 114, the reflector ring 114 can accommodate multiple modular units 2 to form a light ring. In the figure, six modular units 2 are shown, but any number can be used to meet the particular illumination requirements. The modular units 2 are still individually replaceable. Alternately, multiple reflector/modular unit pairs may be assembled together to form a ring, similar to that of FIG. 4, or any other desired shape. A single ballast unit 124 may be used to contain the individual ballasts for each arc lamp, or the ballasts may be placed independently.

For changing modular unit 2, connector 19 is disconnected so that modular unit 2 can be slid out through cylindrical extension 15. A new modular unit 2 is inserted into cylindrical extension 15 so that attachment of mating connectors 8 and 19 lock the modular unit 2 in place, as shown in FIG. 4.

Extending upward from yoke 16 is socket 21 into which pole 20 inserts and locks using quick-release pin 23. If replacement of the reflector 14 and modular unit 2 is required, connectors 8 and 19 are detached and pin 23 is released to remove the entire light head as a unit.

Pole 20 is a hollow pipe which has openings 25 in its side to permit entry and exit of cable into and out of pole 20. The lower pole section 30 inserts into socket 32, held in place by quick-release pin 33. Lower cable 18 runs up lower pole section 30 exiting through opening 25 so that connector 31 can mate with lower connector 22 of ballast power supply 24. A pivot or ratchet assembly may be included at the bottom of pole 20 to permit adjustment of the direction of illumination beyond that provided by reflector 14 alone.

Ballast power supply 24 converts the 120 VAC input signal into a constant current supply for driving arc lamp 4. For underwater mounting and operation, ballast power supply 24 is hermetically sealed in a stainless steel housing to permit reliable watertight operation. Lower connector 22 and upper connector 26 are wet mateable with connectors 31 and 37 respectively. The upper portion of ballast power supply 24 has a socket 35 into which upper pole section 40 inserts and is held in place by quick-release pin 43. The use of wet mateable connectors and quick-release pins at both input and output permit ballast power supply 24 to be replaced as a unit as needed. In an alternate embodiment, where ballast power supply 24 is in air, mounted on a pole or structure sufficiently remote from the water, a weatherproof steel enclosure may be used.

Upper pole section 40 has a lift bail 42 made preferably of stainless steel to facilitate handling and hanging of the assembly from the side of a floating platform or the side of a tank.

Upper cable 28 provides electrical connection between ballast power supply 24 and a 120 VAC source.

Lower cable 18 and upper cable 28 are preferably polyurethane covered for radiation tolerance, durability and easy decontamination. The modular design of the cables facilitates replacement if they are damaged.

The above-described apparatus and method for illuminating an underwater environment are intended for direct replacement of existing incandescent lighting in nuclear pools, but clearly are suitable for other underwater or combination air and underwater applications. The design provides greatly-improved reliability with a minimal amount of maintenance using already-available power sources. Because of the higher efficiency and service lifetime, the operating and maintenance costs are substantially lower. Most importantly, the exposure of maintenance personnel to radiation and other hazards in the underwater environment is drastically reduced.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. An apparatus for illuminating an underwater environment in a nuclear environment comprising:
   at least one unit comprising:
      an arc lamp for emitting light;
      a base for mating with and for conducting electricity to said arc lamp;
      a seal for creating a watertight connection between said arc lamp and said base;
      a light-transmissive impact-resistant cover for enclosing said arc lamp, said base and said seal; and
      a releasable connector attached to said base;
   a polished reflector partially surrounding said at least one unit to control the direction of the reflection of light emitted from said arc lamp of said at least one unit;
   a cable means for providing electricity to said connector; and
   a ballast power supply contained in a watertight housing and connected to said cable means;
   wherein said unit is replaced by disconnecting said releasable connector from an old said unit and connecting it to a new said unit.

2. An apparatus as in claim 1 wherein said polished reflector controls the direction of reflection of light from a plurality of units.

3. An apparatus as in claim 2 wherein said polished reflector is formed in a ring.

4. An apparatus as in claim 1 wherein said conductive connector is wet mateable.

5. An apparatus as in claim 1 wherein said ballast power supply is hermetically sealed in said watertight housing.

6. An apparatus as in claim 1 wherein said ballast power supply is located in air, remote from said underwater environment.

7. An apparatus as in claim 1 wherein a plurality of vent holes are provided in said light-transmissive cover to permit water to flow around said arc lamp.

8. An apparatus as in claim 1 wherein said arc lamp comprises a high pressure sodium arc lamp.

9. An apparatus as in claim 1 wherein said seal comprises a potting material.

10. An apparatus as in claim 1 wherein said seal comprises an O-ring.

11. An apparatus as in claim 1 wherein said light-transmissive cover is a screen comprising a heat-tolerant material.

12. A method for illuminating an underwater environment in a nuclear facility which permits rapid replacement of burned-out light sources to lessen exposure of maintenance personnel to radiation hazards in said underwater environment, said method which comprises:
   forming at least one replaceable unit by the steps of:
      selecting an arc lamp as a light source;
      selecting a base for mating with and for conducting electricity to said arc lamp;
      selecting a releasable connector for attachment to said base;
      sealing said arc lamp to said base with heat- and radiation-tolerant seal to provide a watertight seal; and
      enclosing said arc lamp, said base and said seal in a light-transmissive impact-resistant cover to create a replaceable unit;
   partially surrounding said at least one replaceable unit with a polished reflector to permit directional reflection of light;
   attaching a cable means to said releasable connector; and
   selecting a ballast power supply for connection to said cable means for providing electrical power to said arc lamp whereby said replaceable unit is replaced by disconnecting said releasable connector, inserting a new said unit and connecting said releasable connector of said new unit.

13. A method as in claim 12 wherein the step of partially surrounding said at least one replaceable unit with a polished reflector includes selecting a reflector ring whereby light from a plurality of replaceable units is reflected.

14. A method as in claim 12 wherein the step of selecting a releasable connector includes selecting a wet mateable connector.

15. A method as in claim 12 wherein the step of selecting a ballast power supply includes selecting a ballast power supply sealed in a watertight housing.

16. A method as in claim 12 wherein the step of enclosing said arc lamp, said base and said seal in a light-transmissive impact-resistant cover includes providing a plurality of vent holes in said cover to permit water to flow around said arc lamp.

17. A method as in claim 12 wherein the step of enclosing said arc lamp, said base and said seal in a light-transmissive impact-resistant cover includes selecting a heat-tolerant metal screen.

18. A method as in claim 17 wherein said heat-tolerant metal screen is a stainless steel screen.

19. A method as in claim 12 wherein the step of selecting an arc lamp includes selecting a high pressure sodium arc lamp.

20. A method as in claim 12 further comprising mounting said unit, said polished reflector and said ballast power supply on at least one pole for suspension in said underwater environment.

21. A method for replacement of an existing incandescent light system in a hazardous underwater environment in a nuclear environment which uses the same source of electricity, provides greater efficiency, and lessens exposures of maintenance personnel to radiation in said underwater environment, said method which comprises:

forming at least one replaceable unit by the steps of:
selecting an arc lamp as a light source;
selecting a base for mating with and for conducting electricity;
selecting a releasable connector for attachment to said base;
sealing said arc lamp to said base with a heat- and radiation-tolerant seal to provide a watertight seal; and
enclosing said arc lamp, said base and said seal in a light-transmissive impact-resistant cover to create a replaceable unit;
partially surrounding said at least one replaceable unit with a polished reflector to permit direction reflection of light;
attaching a cable means to said releasable connector; and
selecting a ballast power supply for connection to said cable means for providing electrical power to said arc lamp whereby said replaceable unit is replaced by disconnecting said releasable connector, inserting a new said unit and connecting said releasable connector of said new unit.

22. A method as in claim 21 wherein the step of enclosing said sodium arc lamp, said base and said seal in a light-transmissive impact-resistant cover includes selecting a heat-tolerant metal screen.

* * * * *

UNITED STATES PATENT AND TRADEMARK OFFICE
CERTIFICATE OF CORRECTION

PATENT NO. : 5,213,410
APPLICATION NO. : 07/825564
DATED : May 25, 1993
INVENTOR(S) : Robert S. Acks It is certified that error appears in the above-identified patent and that said Letters Patent is hereby corrected as shown below:

IN THE TITLE PAGE:

Item [*], change the patent term to read as follows: Item --[*] Notice: The portion of the term of this patent subsequent to September 10, 2010 has been disclaimed.--

Signed and Sealed this

Third Day of March, 2009

JOHN DOLL
*Acting Director of the United States Patent and Trademark Office*